United States Patent [19]
Bourne

[11] 3,887,131
[45] June 3, 1975

[54] FLUID DISTRIBUTOR
[75] Inventor: Joseph R. Bourne, De Witt, N.Y.
[73] Assignee: Carrier Corporation, Syracuse, N.Y.
[22] Filed: May 31, 1974
[21] Appl. No.: 475,086

[52] U.S. Cl. .................. 239/110; 239/557; 239/565
[51] Int. Cl. ............................................ B05b 1/20
[58] Field of Search........... 261/72 R, 126; 239/110, 239/119, 750, 536, 556, 557, 565; 55/220, 223

[56] References Cited
UNITED STATES PATENTS

| | | | |
|---|---|---|---|
| 1,259,211 | 3/1918 | Coles | 239/110 |
| 2,548,788 | 4/1951 | Helne | 239/110 |
| 2,607,628 | 8/1952 | Jones | 239/110 |
| 3,419,251 | 12/1968 | Eckert | 239/450 X |

Primary Examiner—M. Henson Wood, Jr.
Assistant Examiner—John J. Love
Attorney, Agent, or Firm—J. Raymond Curtin

[57] ABSTRACT

Apparatus for distributing electrolyzed acid in the scrubber of a gas purification system, comprising a horizontal main header and a plurality of branch lines having horizontal portions extending transversely from the header, the branch lines terminating in vertical risers having removable caps. Acid flowing into the main header proceeds into each of the branch lines and surges into the risers where any contaminants accumulate. Discharge ports are provided along the length of the horizontal portions of the branch lines, and short, open-ended take-off pipes receive acid from these ports and distribute it into the scrubber.

5 Claims, 4 Drawing Figures

FLUID DISTRIBUTOR

BACKGROUND OF THE INVENTION

1. Field of the Invention

This invention relates to the distribution of fluid, and in particular to the distribution of liquids across an area in a downward direction in a counterflow relationship to a flow of gases, for the purpose of effecting substantial contact between the liquid and the gases.

2. Description of the Prior Art

Commonly assigned U.S. Pat. No. 3,793,171, which issued on Feb. 19, 1974, under the title "Process for Removing Pollutants from Gas Stream," discloses a continuous process for destroying oxidizable odorous and pollutant impurities carried in a gas stream. The process comprises the steps of contacting the gas stream in mass transfer relationship with an aqueous acid stream containing an electrolytically regeneratable ionic oxidizing agent, electrolytically regenerating the oxidizing agent and recirculating the acid stream. Apparatus for practicing the foregoing process includes a vertical tank or scrubber containing a large amount of packing. Electrolyzed acid solution is introduced into the upper part of the tank through a spray head and the spray flows downwardly through the packing to a drain. Untreated air is introduced into the base of the tank and it flows upwardly through the tank in a mass transfer, counterflow relationship with the acid solution. The oxidizing agent in the acid solution reacts with and destroys the impurities carried by the gas stream. The spent acid solution is drained from the tank and forwarded to an electrolytic cell wherein the acid solution is regenerated. The regenerated solution is then returned to the spray head in the tank.

Extensive mass transfer between the acid solution and the air stream is very important and the apparatus for introducing the acid into the scrubber should be capable of supplying acid solution across the full area of the tank in a spray for extended periods of time. Therefore, the acid flow route into the scrubber should not be susceptible to clogging, and the spray across the tank should be fairly uniform. However, the acid solution should not be distributed across the scrubber in the form of droplets small enough to be carried upwardly by the air stream. It is often necessary to catch such droplets in a demisting apparatus disposed near the air discharge opening in the scrubber, and the size and cost thereof is dependent upon the quantity of liquid transported thereto.

SUMMARY OF THE INVENTION

An object of the present invention is to distribute a liquid downwardly across an area of a tank in a mass transfer, counterflow relationship with a gas flowing upwardly in the tank.

A more specific object of the present invention is to distribute an electrolytic acid solution downwardly in the scrubber of a gas purification system in a mass transfer, counterflow relationship with a gas being purified and flowing upwardly through the scrubber.

Still another object of the present invention is to provide a distributor for distributing electrolytic acid in the foregoing manner, which distributor provides for the uniform distribution of the acid solution across the scrubber.

Yet another object is to provide a distributor of the preceding type which is not susceptible to clogging by contaminants carried by the acid solution.

A further object of the invention is to provide a distributor of the preceding type which inhibits the agglomerations of sediment and other impurities in the apparatus.

A still further object of the invention is to provide a distributor of the preceding type which can be cleaned with ease.

Another more general object of the invention is to provide a distributor of the foregoing type which is efficient, reliable, and economical to manufacture, install and operate. Other objects will be apparent from the description to follow and from the appended claims.

The preceding objects are achieved according to the preferred embodiment of the invention by the provision of a distributor comprising a main header and a plurality of lateral branches having horizontal portions extending transversely from the header and terminating in vertical risers. Discharge ports are provided along the lower part of the horizontal portion of each of the lateral branches, and short, open-ended take-off pipes are provided beneath these ports for receiving liquid discharged from them and for distributing the liquid through discharge openings at the opposite ends of the pipes. The vertical risers of the lateral branches receive surges of acid solution being fed into the distributor, and impurities and sediment tend to accumulate in or near those risers rather than collecting in the vicinity of the discharge ports where they might tend to cause clogging of the latter. Removable end caps are provided on the vertical risers which give access to the interior thereof so that any residue left in the risers can be cleaned out.

DESCRIPTION OF THE PREFERRED EMBODIMENT

Figure 1:
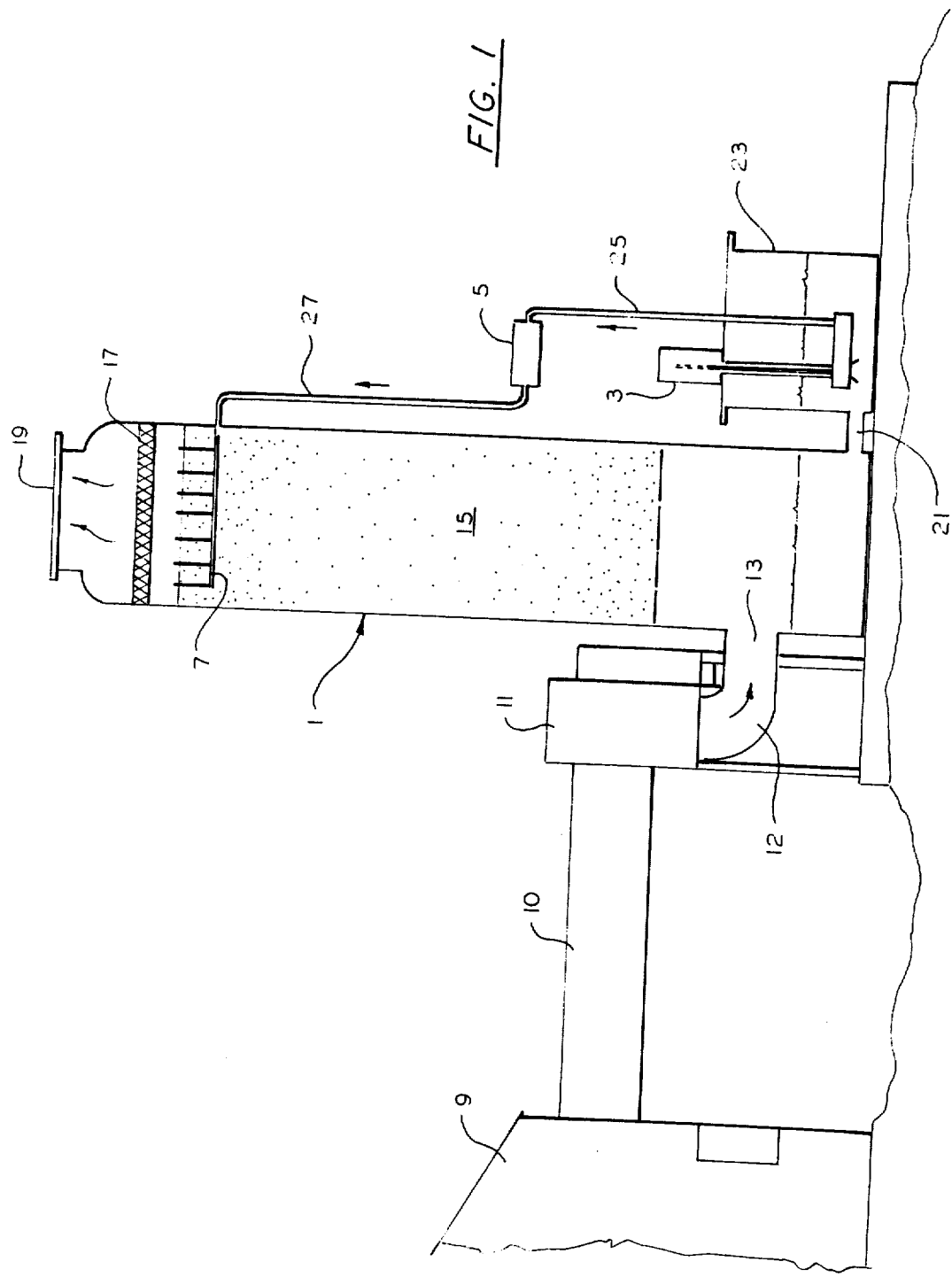
FIG. 1 shows in schematic form a gas purification system incorporating a distributor according to the present invention.

The present invention provides a liquid distributor particularly adapted for distributing an electrolytic acid solution in the scrubber of a gas purification system for the purpose of removing certain organic materials in air being purified. Such a system is shown schematically in FIG. 1. Referring to the figure, the system includes a scrubber 1, a pump 3 for circulating an acid solution, a regenerator 5 for electrolyzing acid solution flowing therethrough, and a distributor 7 which is the subject of the present invention. Air containing odorous materials and other pollutants emanating from a source 9 flows through a series of ducts 10, 11 and 12, and through an air inlet 13 into scrubber 1. A bed of packing 15 extends upwardly from a support near the lower portion of scrubber 1 to a level near the uppermost part of distributor 7. Air from duct 13 flows upwardly through packing 15 wherein it contacts acid solution flowing downwardly from distributor 7. The treated gas proceeds through a demisting apparatus 17 where liquid droplets are filtered from the air stream, and thence through outlet 19 into the atmosphere.

The acid solution referred to above is preferably an aqueous acid stream containing an electrolytically regeneratable oxidizing agent as discussed more fully in previously cited U.S. Pat. No. 3,793,171. The electrolyzed acid flows from distributor 7 downwardly through packing 15 and the oxidizing agent therein reacts with and oxidizes oxidizable impurities in the untreated or waste gases moving upwardly through the packing. Spent acid falls to the base of scrubber 1 and proceeds through a drain 21 into a receiving tank 23. Pump 3 moves the spent acid solution through a pipe 25 into regenerator 5 wherein the liquid is electrolyzed to regenerate the oxidizing agents in the solution. The acid solution then proceeds back to distributor 7 through a pipe 27.

The acid solution flowing through the system often contains contaminants which, unless dealt with properly, can seriously impair the functioning of the system. First, contaminants such as grease, dirt, and oil could clog discharge holes in the distributor and block flow of acid solution into scrubber 1. If a sufficient number of these holes were clogged, the flow of liquid through the scrubber would be distributed unevenly and portions of the air stream might pass through the scrubber untreated. Secondly, contaminants which are able to flow into the scrubber may be carried upwardly by the air flowing through the packing and could be caught in and clog the demisting apparatus, thus impairing the functioning of that element. Third, if the contaminants should partially clog discharge openings in the distributor, they could cause the acid solution to flow in extremely small streams which would cause the formation of minute droplets, and these droplets could be carried upwardly by the air and they could also clog and impair the functioning of the demisting apparatus.

As suggested in the preceding paragraph, it is important that the acid solution flow in streams which are large enough so that liquid droplets cannot be carried upwardly by the gas flowing towards the discharge openings of the scrubber. On the other hand, the acid solution must be distributed fairly uniformly across the area of scrubber 1 so that desired mass transfer between the acid solution and the air occurs. Also, the packing, which assists in increasing the contact area between the gas and the acid solution, functions best if it is covered with acid, and such coverings can be achieved more easily if there is no loss of acid solution to air passing through the demisting apparatus. Moreover, by inhibiting the transport of liquid solution to the demisting apparatus, the apparatus size can be selected without having to accommodate additional liquid.

For the foregoing reasons, it can be seen that the distributor plays a vital role in the functioning of the entire air purification system. The effectiveness of the distributor affects the efficiency and economy of the system.

Figure 2:
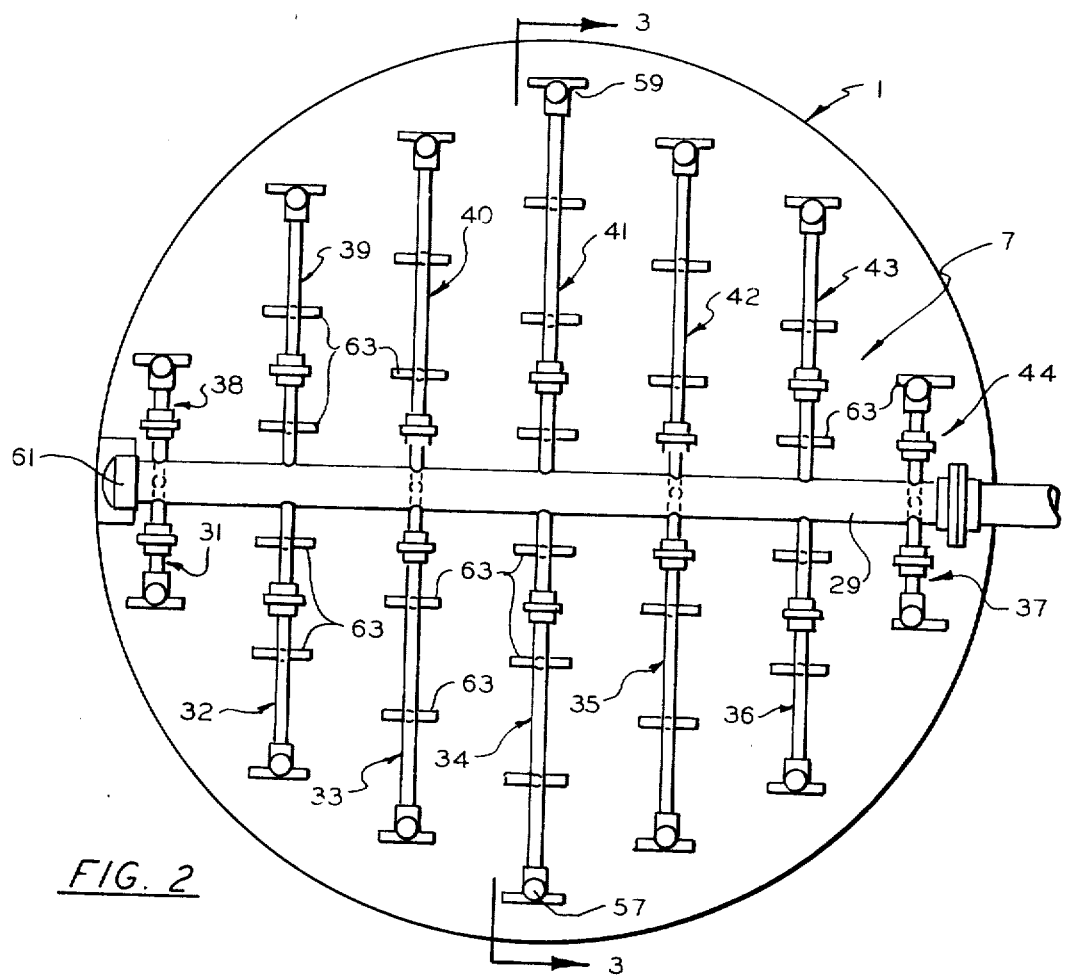
FIG. 2 is a top view of the scrubber incorporated in the system shown in FIG. 1, depicting the distributor according to the present invention.
Figure 3:
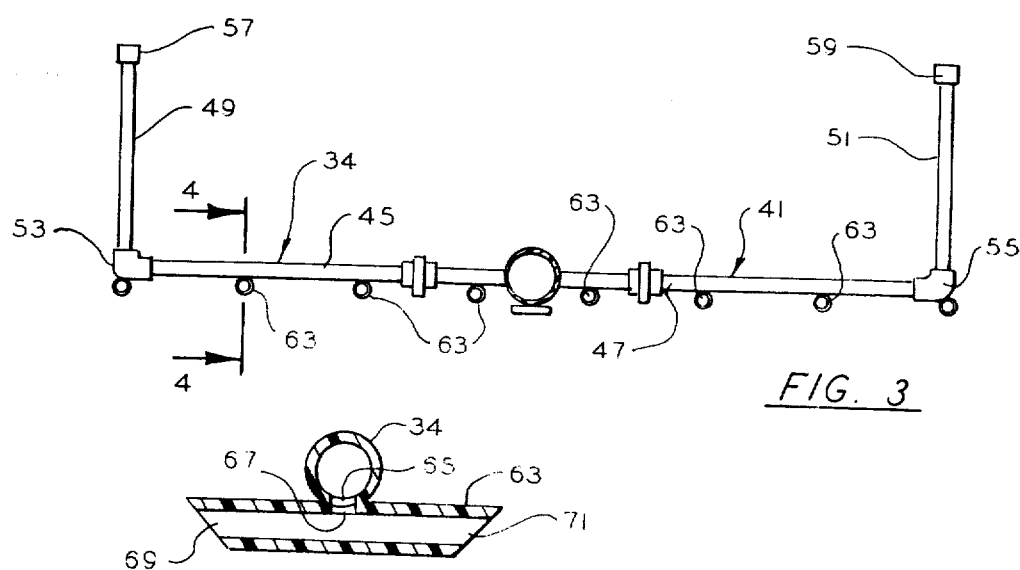
FIG. 3 is a section taken in the direction 3—3 as shown in FIG. 2.

Referring now to FIG. 2, distributor 7 is shown as mounted in scrubber 1. Distributor 7 comprises a main header 29 into which the acid solution flows from regenerator 5, and a plurality of branch lateral lines 31–44. The branch lateral lines are of similar construction, each including a horizontal section generally coplanar with main header 29 and extending from the header to a position spaced slightly from the wall of scrubber 1, and a vertical riser extending upwardly from the end of the horizontal portion of the line. Considering branch lines 34 and 41 as typical of the other lines, FIG. 3 shows these lateral branch lines as including horizontal sections 45 and 47, and vertical risers 49 and 51, respectively. Lines 49 and 51 can be connected to their associated horizontal lines by means of conventional elbows 53 and 55, respectively. Each of the risers in each lateral branch line preferably has a removable end cap which, when removed from its riser, enables the cleaning of that lateral branch line. The risers and their caps can have mating threads for securing the caps on the risers. In FIG. 3, a removable cap 57 is provided on riser 49, and a cap 59 is provided on riser 51. In addition, an end cap 61 can be provided at the end of header 29 so that the latter element can be cleaned as well. Depending on the size of scrubber 1, the free ends of the lateral branch lines can be supported by appropriate fixtures in scrubber 1 and an additional support can be provided for the end of main header 29.

Figure 4:
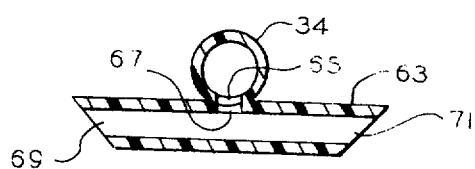
FIG. 4 is a sectional view taken in a direction 4—4 as indicated in FIG. 3.

The horizontal section of each lateral branch line has a series of small openings in its lower side from which acid solution can be discharged from the line. These openings are spaced so that a fairly even distribution of acid solution occurs across the area of scrubber 1. Connected to each lateral branch line at each discharge opening is a take-off 63. Referring to FIG. 4, which is considered as illustrative of the construction of the take-offs and their associated lateral branch lines, branch line 34 is shown as including a discharge opening 65. Take-off 63 has a corresponding opening 67, and take-off 63 is attached to lateral line 34 so that openings 65 and 67 are aligned. Take-off 63 is secured to line 34 by some appropriate means such as a weld or an adhesive, so that the juncture between the two elements around the aligned openings is fluid tight. Take-off 63, which preferably is merely a short section of pipe, is open at its opposite ends so that liquid passing through opening 67 can be discharged therefrom for downward flow through packing 15. The ends of each take-off 63 are preferably beveled as indicated at 69 and 71 to increase the area of the openings for the purpose of precluding the clogging thereof. Take-off 63 divides the liquid passing through opening 65 from lateral line into two liquid streams, thereby doubling the area of flow of the liquid and increasing the contact between the gas flow passing upwardly through packing 15 and the liquid solution. Furthermore, the likelihood of clogging of the final discharge openings of the acid solution is significantly diminished. The take-offs are very effective in avoiding the previously referred to problem of acid solution breaking up into fine droplets and being carried upwardly by the flow of air. Without the take-offs, there is a reasonable probability that at least some of the discharge ports would become clogged by the packing in scrubber 1. The packing would thus decrease the effective size of the openings in the branch lateral lines, causing the acid solution to pass into the packing under high pressure. Such pressurized flow would cause the acid solution to break up into the undesirable droplets upon impact. The take-offs assure that the acid will enter the packing under very low pressure so that the acid stream amounts to a trickle which flows evenly down through the packing without forming any minute droplets. In addition, without the use of the take-offs, it normally would be necessary to increase the amount of packing present in the scrubber for the purpose of catching droplets of acid solution flowing upwardly with the air. The presence of the take-offs makes such additional packing unnecessary. For the same reason, the size of the demisting apparatus can be kept down.

The function of the risers provided on the ends of each of the branch lateral lines is to avoid the problem of clogging of the discharge openings. It has been found that when the branch lateral lines terminate at the ends of each of the horizontal sections, dirt and other contaminants commence accumulating at these dead ends. Eventually, these accumulations grow in the direction of the main header and eventually clog the discharge openings from the lateral lines. The vertical risers eliminate the dead ends at the termination of the horizontal sections, and when the acid solution pump 3 commences operation following a period of shutdown, the fluid surges past the various distribution openings and flows into the vertical risers where the lighter contaminants tend to accumulate. Any agglomeration of lighter particles occurs in the vertical risers and therefore is harmless. Upon start-up, the surge of acid solution breaks down these agglomerations to prevent them from growing to a possibly dangerous size. Also, the surge of fluid upon start-up dislodges any large particles of contaminating material from the discharge openings in the branch lateral lines and washes them towards the vertical risers and generally out of the way of the flow of the acid solution.

The removable cap of the risers permit the easy cleaning of the risers. The system is designed so that the risers extend beyond the highest level of packing 15 in the scrubber, whereby the caps are readily removable from the risers. Once the caps are removed, contaminants can be sucked out of the risers or, more appropriately, the branch lateral lines can be back-flushed by forcing fluid under pressure into the vertical risers to clean out the entire branch lateral lines and the main header.

In practice, it has been found that for a scrubber having an approximate inner diameter of 8 feet, a main header having an inner diameter of approximately 4 inches worked well with branch lateral lines having 1½ inch inner diameters and 1 inch take-offs. However, these dimensions would vary with the size of the scrubber, the desired flow rate of acid solution, the amount of contaminants in the acid solution, and other related factors.

It can be seen from the foregoing description that the preferred embodiment of the invention fulfills each of the objects set forth above. A distributor provided hereby is efficient and reliable in operation, and economical to operate.

The invention has been described in detail with particular reference to a preferred embodiment thereof, but it will be understood that variations and modification can be effected within the spirit and scope of the invention.

I claim:

1. Apparatus for distributing downwardly through an area a liquid in a mass transfer, counterflow relationship with a gas flowing upwardly through the area, said apparatus comprising:

a generally horizontally disposed main header for receiving liquid to be distributed; and a plurality of branch lateral lines extending transversely from said main header, said branch lateral lines each including:

a generally horizontal portion joined at one end to said main header, said horizontal portion having a set of spaced ports for discharging liquid across said area; and a vertical riser at the other end of the horizontal portion for receiving surges of liquid flowing through said horizontal section.

2. Apparatus according to claim 1 and further including a cap on the upper end of each riser, said cap being removable from the riser to give access to the interior of the branch lateral line.

3. Apparatus according to claim 1 and further including a take-off pipe associated with each of a plurality of said ports, each take-off pipe comprising an open-ended tube having an inlet intermediate the ends of the tube for receiving liquid from the associated discharge port and for discharging the liquid from said ends of the tube.

4. Apparatus according to claim 3 wherein said take-off pipes are generally horizontal and attached transversely to the branch lateral line having the port with which each take-off pipe is associated.

5. Apparatus according to claim 3 wherein the open ends of said take-off pipe are beveled.

* * * * *